(12) United States Patent
Takahashi et al.

(10) Patent No.: US 12,038,657 B2
(45) Date of Patent: Jul. 16, 2024

(54) LIQUID CRYSTAL PANEL AND METHOD FOR MANUFACTURING LIQUID CRYSTAL DISPLAY DEVICE

(71) Applicant: Sharp Display Technology Corporation, Kameyama (JP)

(72) Inventors: Isao Takahashi, Kameyama (JP); Yohsuke Fujikawa, Kameyama (JP); Takuya Hachida, Kameyama (JP); Shun Iinuma, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/506,898

(22) Filed: Nov. 10, 2023

(65) Prior Publication Data

US 2024/0201547 A1 Jun. 20, 2024

(30) Foreign Application Priority Data

Dec. 16, 2022 (JP) .................. 2022-201651

(51) Int. Cl.
*G02F 1/1362* (2006.01)
*G02F 1/1368* (2006.01)

(52) U.S. Cl.
CPC .. *G02F 1/136254* (2021.01); *G02F 1/136286* (2013.01); *G02F 1/1368* (2013.01)

(58) Field of Classification Search
CPC ................................. G02F 1/136254
See application file for complete search history.

(56) References Cited

U.S. PATENT DOCUMENTS

| | | | |
|---|---|---|---|
| 2007/0296453 | A1 | 12/2007 | Ootaguro et al. |
| 2009/0284706 | A1* | 11/2009 | Liu ........... G02F 1/1362 349/149 |
| 2018/0031892 | A1* | 2/2018 | Masui ........... G02F 1/13458 |
| 2018/0182274 | A1* | 6/2018 | Jung ........... G09G 3/006 |
| 2019/0079330 | A1* | 3/2019 | Yamamoto ........... G09G 3/3648 |

FOREIGN PATENT DOCUMENTS

| | | |
|---|---|---|
| JP | 2004-205852 A | 7/2004 |
| JP | 2007-310130 A | 11/2007 |

\* cited by examiner

*Primary Examiner* — James A Dudek
(74) *Attorney, Agent, or Firm* — ScienBiziP, P.C.

(57) ABSTRACT

A liquid crystal panel includes an active matrix substrate including a gate driver circuit, a demultiplexer circuit, and a gate switch circuit. The active matrix substrate includes a non-display region and a testing terminal region located outside the non-display region, has first and second in-panel testing terminals in the non-display region, and has first and second out-panel testing terminals in the testing terminal region. The second out-panel testing terminal is connected to the gate driver circuit. The first out-panel testing terminal is connected to the demultiplexer circuit. The second in-panel testing terminal is connected to the gate switch circuit. The first in-panel testing terminal is connected to the demultiplexer circuit.

9 Claims, 12 Drawing Sheets

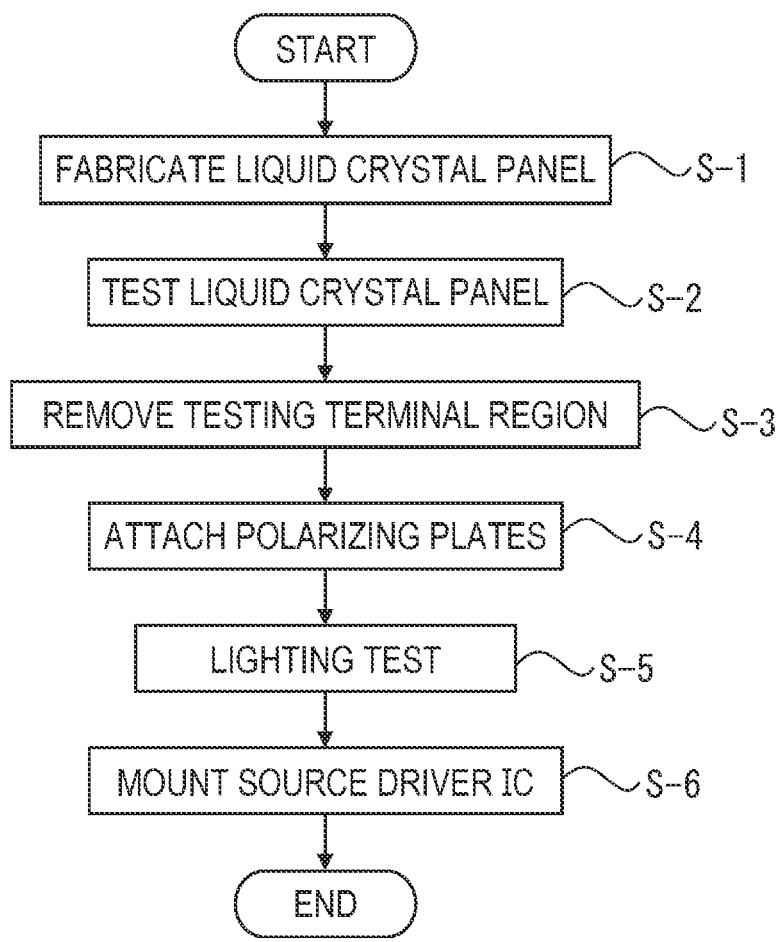

LIQUID CRYSTAL PANEL AND METHOD FOR MANUFACTURING LIQUID CRYSTAL DISPLAY DEVICE

BACKGROUND

1. Field

The present disclosure relates to a liquid crystal panel and a method for manufacturing a liquid crystal display device.

2. Description of the Related Art

A liquid crystal display device typically includes an active matrix substrate, and the active matrix substrate is mounted with a driver IC. From the point of view of avoiding waste of the driver IC, it is preferable that the liquid crystal display device be subjected to a performance test before the driver IC is mounted. For example, Japanese Unexamined Patent Application Publication No. 2004-205852 discloses a liquid crystal display device that can be subjected to a lighting test prior to the mounting of a driver IC.

It is desirable to provide a liquid crystal panel that can be tested at multiple stages during a manufacturing process and a method for manufacturing a liquid crystal display device.

SUMMARY

According to an aspect of the disclosure, there is provided a liquid crystal panel including an active matrix substrate, a counter substrate, and a liquid crystal layer sandwiched between the active matrix substrate and the counter substrate. The active matrix substrate includes a substrate having a principal surface including a display region, a non-display region located around the display region, and a testing terminal region located outside and adjacent to the non-display region, a plurality of source bus lines each disposed in the display region of the substrate, the plurality of source bus lines extending in a first direction, a plurality of gate bus lines each disposed in the display region of the substrate, the plurality of gate bus extending in a second direction intersecting the first direction, a plurality of pixels disposed in the display region of the substrate, the pixels including TFTs each connected to one of the plurality of source bus lines and one of the plurality of gate bus lines, a first out-panel testing terminal disposed in the testing terminal region of the substrate, a second out-panel testing terminal disposed in the testing terminal region of the substrate, a first in-panel testing terminal disposed in the non-display region of the substrate, a second in-panel testing terminal disposed in the non-display region of the substrate, a gate driver circuit disposed in the non-display region of the substrate and connected to the plurality of gate bus lines and the second out-panel testing terminal, a gate switch circuit disposed in the non-display region of the substrate and connected to the plurality of gate bus lines and the second in-panel testing terminal, the gate switch circuit outputting a control signal to the plurality of gate bus lines in accordance with a signal that is inputted from the second in-panel testing terminal, and a demultiplexer circuit disposed in the non-display region of the substrate and connected to the plurality of source bus lines, the first out-panel testing terminal, and the first in-panel testing terminal.

BRIEF DESCRIPTION OF THE DRAWINGS

FIG. 5 is a flow chart showing a method for manufacturing a liquid crystal display device of the first embodiment;

DESCRIPTION OF THE EMBODIMENTS

Figure 1:
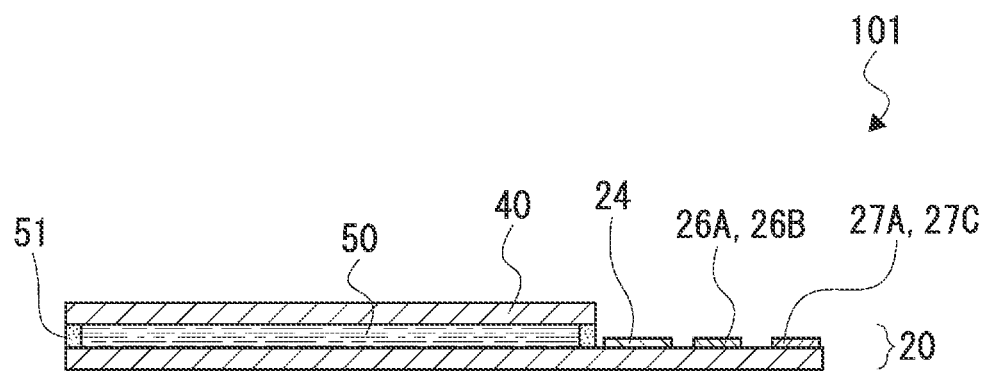
FIG. 1 is a schematic cross-sectional view showing an example configuration of a liquid crystal panel according to a first embodiment.

In a small to medium-sized liquid crystal display device, part or the whole of a driver IC may be monolithically formed in the active matrix substrate from the point of view of a reduction in size, a reduction in power consumption, or a reduction in thickness. For example, since a gate driver circuit can be constituted primarily by a shift register, the whole of the gate driver circuit can be monolithically formed in the active matrix substrate using the same semiconductor material as TFTs that constitute pixels. Meanwhile, since a source driver circuit is large in circuit size, it is conceivable that only a demultiplexer circuit may be formed in the active matrix substrate, that the remaining circuits of a source driver may be constituted by IC chips in the form of bare chips, packaged chips, or other chips, and that a source driver IC may be mounted on the active matrix substrate.

In this case, unless the source driver IC is mounted on the active matrix substrate, the liquid crystal display device is not ready for a performance test. However, in a case where the liquid crystal display device is rejected by the test after the source driver IC has been mounted, the source driver IC thus mounted is wasted.

Further, in a case where the liquid crystal display device is used in a head-mounted display, the distance from the eyes of a user to the liquid crystal display device is short, and the liquid crystal display device is viewed via an optical system, so that even minute bright spots affect the display quality of the liquid crystal display device. In order to check for such minute bright spots, it is preferable that a test be performed with polarizing plates sticking to the liquid crystal panel.

This is because an air layer present between each of the polarizing plates and the liquid crystal panel causes light to refractively scatter and causes the bright spots to appear blurred.

However, in a case where bright-spot defects in the liquid crystal panel exceed the test limit and the liquid crystal panel fails the test after the polarizing plates have been pasted to the liquid crystal panel, the polarizing plates thus pasted are wasted.

For these reasons, it is preferable that the liquid crystal display device be tested at multiple stages during a manufacturing process. To address this problem, the inventors conceived of a novel liquid crystal display device and a novel method for manufacturing a liquid crystal display device.

Embodiments of the present disclosure are described below with reference to the drawings. The present disclosure is not limited to the following embodiments and is subject to design change as appropriate to such an extent as to fulfill the configurations of the present disclosure. Further, in the following description, different drawings use identical signs in common for identical components or components having similar functions, and a repeated description thereof may be omitted. Further, configurations described in the embodiments and modifications may be combined or changed as appropriate without departing from the scope of the present disclosure. For the sake of clarity, the drawings to be referred to below may show a configuration in a simplified or illustrative manner and may omit some constituent members. Further, the dimensional ratio between one constituent member and another shown in each drawing does not necessarily represent an actual dimensional ratio.

First Embodiment

FIG. 1 is a schematic cross-sectional view showing an example configuration of a liquid crystal panel 101 of the present embodiment. The liquid crystal panel 101 includes an active matrix substrate 20, a counter substrate 40, and a liquid crystal layer 50.

The liquid crystal layer 50 is located between the active matrix substrate 20 and the counter substrate 40 and is sealed in between the active matrix substrate 20 and the counter substrate 40 by a seal 51.

Figure 2:
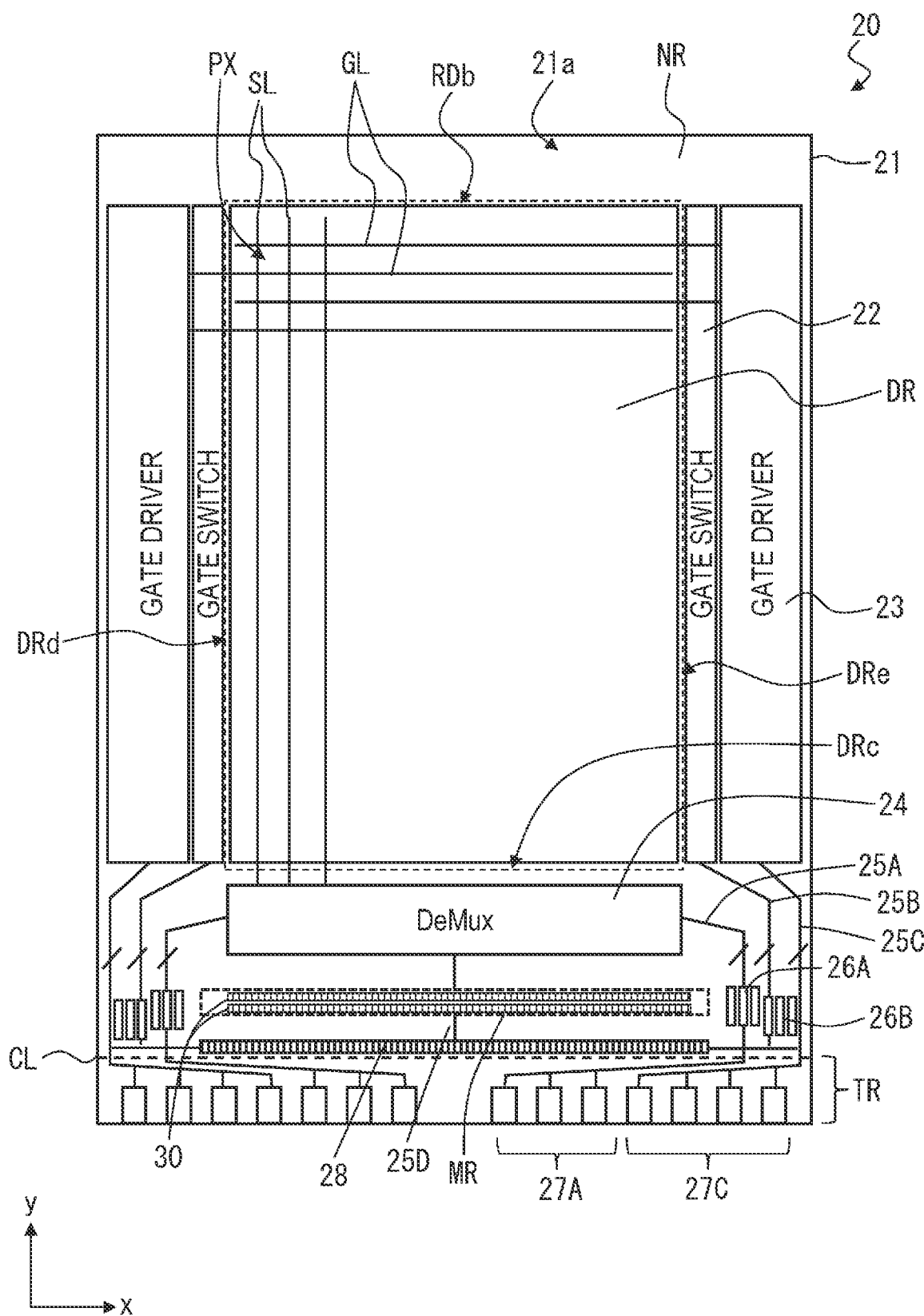
FIG. 2 is a schematic view showing a configuration of an active matrix substrate of the liquid crystal panel shown in FIG. 1.

FIG. 2 is a schematic view showing an example configuration of the active matrix substrate 20. The active matrix substrate 20 includes a substrate 21, a plurality of source bus lines SL, a plurality of gate bus lines GL, and a plurality of pixels PX.

The substrate 21 is constituted, for example, by a translucent material and includes a display region DR, a non-display region NR, and a testing terminal region TR on a principal surface 21a.

The display region DR is disposed in the center of the principal surface 21a, and the non-display region NR is located around the display region DR and surrounds the display region DR. The testing terminal region TR is located outside and adjacent to the non-display region NR.

In the present embodiment, the display region DR has a rectangular shape and includes sides DRb and DRc that are parallel to an x axis and sides DRd and DRe that are parallel to a y axis. The non-display region NR touches the sides DRb, DRc, DRd, and DRe and surrounds the display region DR. The testing terminal region TR is adjacent to the side DRc across the non-display region NR.

The plurality of gate bus lines GL, the plurality of source bus lines SL, and the plurality of pixels PX are disposed in the display region DR. Specifically, the plurality of gate bus lines GL extend in an x-axis direction that is a first direction, and are placed at predetermined spacings in a y-axis direction that is a second direction orthogonal to the first direction. Further, the source bus lines SL extend in the y-axis direction and are placed at predetermined spacings in the x-axis direction. Each of the pixels PX is disposed in a region surrounded by a pair of adjacent gate bus lines GL and a pair of adjacent source bus lines SL.

The gate bus lines GL and the source bus lines SL each have one end extended to the non-display region NR and connected to a driving circuit for driving the after-mentioned pixels PX and to a switch circuit. In the present embodiment, the plurality of gate bus lines GL alternately extend to a portion of the non-display region NR that is adjacent to the side DRe and a portion of the non-display region NR that is adjacent to the side DRd. Further, the source bus lines SL extend to a portion of the non-display region NR that is adjacent to the side DRc.

Figure 3:
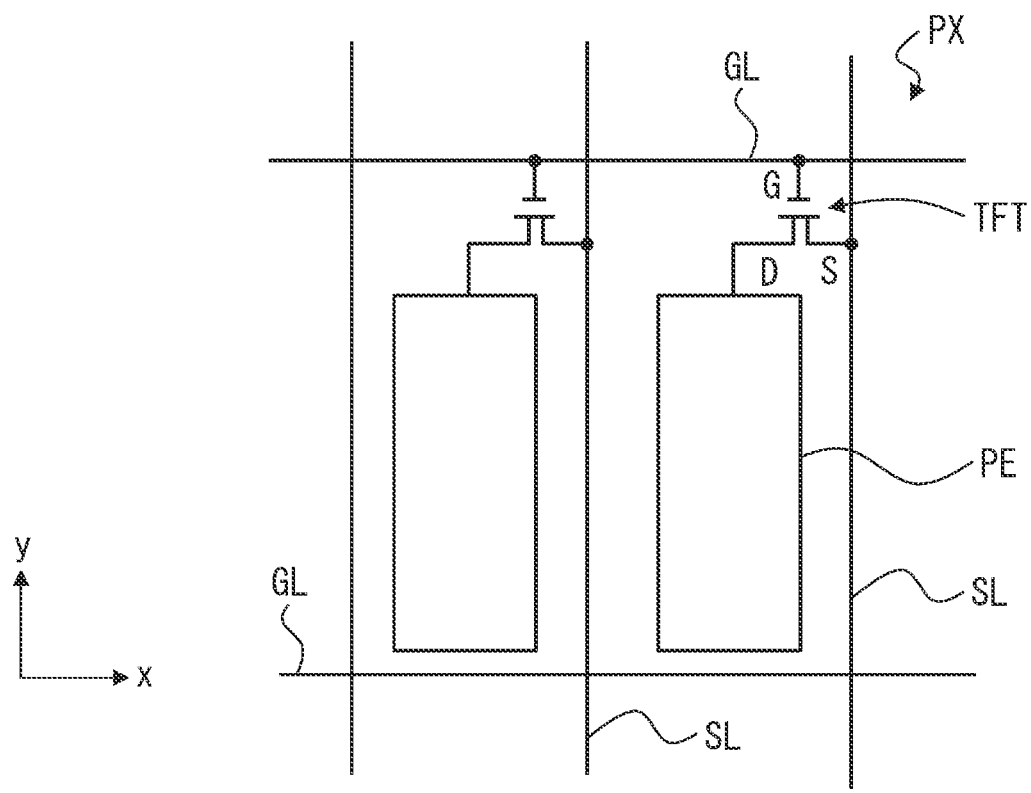
FIG. 3 is a schematic view showing a configuration of a pixel.

FIG. 3 is a schematic view showing a configuration of each of the pixels PX. Each of the pixels PX includes a pixel electrode PE and a TFT. For example, the TFT of each pixel PX has its gate electrode G connected to a gate bus line GL, has its source electrode S connected to a source bus line SL, and has its drain electrode D connected to the pixel electrode PE.

As shown in FIG. 2, the active matrix substrate 20 includes a gate switch circuit 22, a gate driver circuit 23, and a demultiplexer circuit 24. Further, the active matrix substrate 20 includes a first in-panel testing terminal 26A, a second in-panel testing terminal 26B, a first out-panel testing terminal 27A, a second out-panel testing terminal 27C, and an external terminal 28.

In the present embodiment, the gate switch circuit 22 is divided into two gate switch circuits 22 disposed in portions of the non-display region NR that are adjacent to the side DRd and the side DRe, respectively. The two gate switch circuits 22 are connected to the gate bus lines GL, each of which extends to the non-display region NR.

The gate switch circuit 22 is a circuit provided for testing the liquid crystal panel 101 and simultaneously lights up/down the pixels PX of the liquid crystal panel 101 in order to find bright-spot defects and black-spot defects in the liquid crystal panel 101. Specifically, the gate switch circuit 22 simultaneously outputs, to the plurality of gate bus lines GL, gate signals that turn on the TFTs of each separate pixel PX. The gate switch circuit 22 may be constituted by a smaller number of TFTs than in a case where the gate bus lines GL are scanned in sequence as in the case of a gate driver circuit, and is small in circuit size.

The gate driver circuit 23 too is divided into two gate driver circuits 23 disposed in portions of the non-display region NR that are adjacent to the side DRd and the side DRe, respectively. The two gate driver circuits 23 are connected to the gate bus lines GL, each of which extends to the non-display region NR.

The gate driver circuit 23 drives the plurality of gate bus lines GL. Specifically, the gate driver circuit 23 sequentially applies, to the gate bus lines GL, control signals for turning on the TFTs of the pixels PX connected separately to each of the gate bus lines GL.

The demultiplexer circuit 24 is disposed in the non-display region NR and connected to the source bus lines SL, which extend to the non-display region NR. In the present embodiment, the demultiplexer circuit 24 is disposed adjacent to the side DRc of the display region DR.

The demultiplexer circuit 24 for example receives, from a source driver IC, a display data signal serially containing RGB luminance information for each pixel and outputs a display data signal parallelly containing RGB pixel luminance information.

It is preferable that the gate switch circuit 22, the gate driver circuit 23, and the demultiplexer circuit 24 be monolithically formed in the active matrix substrate 20. For example, the gate switch circuit 22, the gate driver circuit 23, and the demultiplexer circuit 24 are each constituted by TFTs, and it is preferable that the gate switch circuit 22, the gate driver circuit 23, and the demultiplexer circuit 24 be formed on top of the substrate 21 during the process for manufacturing the active matrix substrate 20. The TFTs of the pixels PX and the TFTs that constitute the gate switch circuit 22, the gate driver circuit 23, and the demultiplexer circuit 24 may include a semiconductor layer of the same material. In this case, the TFTs of the pixels PX and the TFTs that constitute the gate switch circuit 22, the gate driver circuit 23, and the demultiplexer circuit 24 can be simultaneously formed. The TFTs of the pixels PX and the TFTs that constitute the gate switch circuit 22, the gate driver circuit 23, and the demultiplexer circuit 24 may contain, for example, one substance selected from the group consisting of polysilicon, amorphous silicon, and an oxide semiconductor.

Further, although, in the present embodiment, the gate switch circuit 22 is divided into two gate switch circuits 22 and the gate driver circuit 23 is divided into two gate driver circuits 23, the gate switch circuit 22 may be one gate switch circuit 22 and the gate driver circuit 23 may be one gate driver circuit 23, or the gate switch circuit 22 may be divided into three or more gate switch circuits 22 and the gate driver circuit 23 may be divided into three or more gate driver circuits 23.

The active matrix substrate 20 has a mounting region MR in the non-display region NR. The mounting region MR is for example adjacent to the demultiplexer circuit 24. In the mounting region MR, the after-mentioned source driver IC is disposed. In the mounting region MR, pads 30 to which terminals of the source driver IC are connected are disposed.

The first in-panel testing terminal 26A, the second in-panel testing terminal 26B, and the external terminal 28 are disposed in the non-display region NR. Meanwhile, the first out-panel testing terminal 27A and the second out-panel testing terminal 27C are disposed in the testing terminal region TR. To the external terminal 28, a flexible circuit substrate that transmits signals that are outputted from a timing controller for driving the liquid crystal display device is connected.

In order to connect these terminals to the gate switch circuit 22, the gate driver circuit 23, and the demultiplexer circuit 24, the active matrix substrate 20 further includes a first wire 25A, a second wire 25B, a third wire 25C, and a fourth wire 25D.

The first wire 25A connects the demultiplexer circuit 24 to the first in-panel testing terminal 26A and the first out-panel testing terminal 27A. The second wire 25B connects the gate switch circuit 22 to the second in-panel testing terminal 26B. The third wire 25C connects the gate driver circuit 23 to the second out-panel testing terminal 27C and the external terminal 28. The fourth wire 25D connects the demultiplexer circuit 24 to the pads 30 in the mounting region MR and the external terminal 28.

In FIG. 2, the numbers, locations, shapes, or other attributes of wires and terminals are schematically shown. The first out-panel testing terminal 27A and the second out-panel testing terminal 27C are used to perform a performance test on the gate driver circuit 23, the demultiplexer circuit 24, and the pixels PX, i.e. a test as to whether the liquid crystal panel 101 works properly. The numbers of first out-panel testing terminals 27A and second out-panel testing terminals 27C need to be large, as the first out-panel testing terminals 27A and the second out-panel testing terminals 27C individually control the pixels PX.

Meanwhile, the first in-panel testing terminal 26A and the second in-panel testing terminal 26B are used to check for bright-spot defects and black-spot defects by simultaneously controlling all pixels PX of the liquid crystal panel 101. The numbers of first in-panel testing terminals 26A and second in-panel testing terminals 26B may be small, as the first in-panel testing terminals 26A and the second in-panel testing terminals 26B do not need to individually control the pixels PX. That is, the total number of first in-panel testing terminals 26A and second in-panel testing terminals 26B is smaller than the total number of first out-panel testing terminals 27A and second out-panel testing terminals 27C.

Note, however, that the testing terminal region TR is removed after the testing of the liquid crystal panel 101 and is not included in the finished liquid crystal display device. This makes it possible to make the testing terminal region TR wide, form the first out-panel testing terminal 27A and the second out-panel testing terminal 27C in sizes and shapes suitable for testing, and dispose the first out-panel testing terminal 27A and the second out-panel testing terminal 27C in the testing terminal region TR to the extent that the active matrix substrate 20 can be handled in a manufacturing process.

On the other hand, it is preferable that the non-display region NR be small, as the non-display region NR is included as a frame region in the finished liquid crystal display device. This makes it possible to dispose the first in-panel testing terminal 26A and the second in-panel testing terminal 26B without making the non-display region NR large, as the total number of first in-panel testing terminals 26A and second in-panel testing terminals 26B may be small.

Figure 4A:
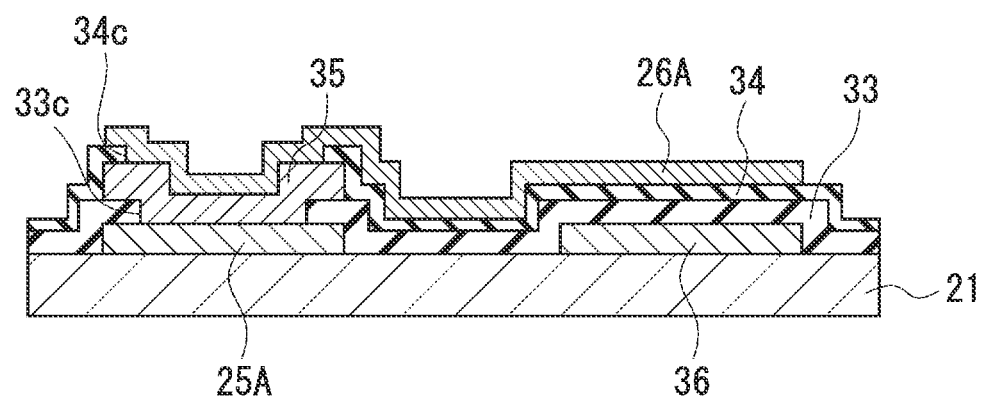
FIG. 4A is a schematic cross-sectional view of a first in-panel testing terminal.
Figure 4B:
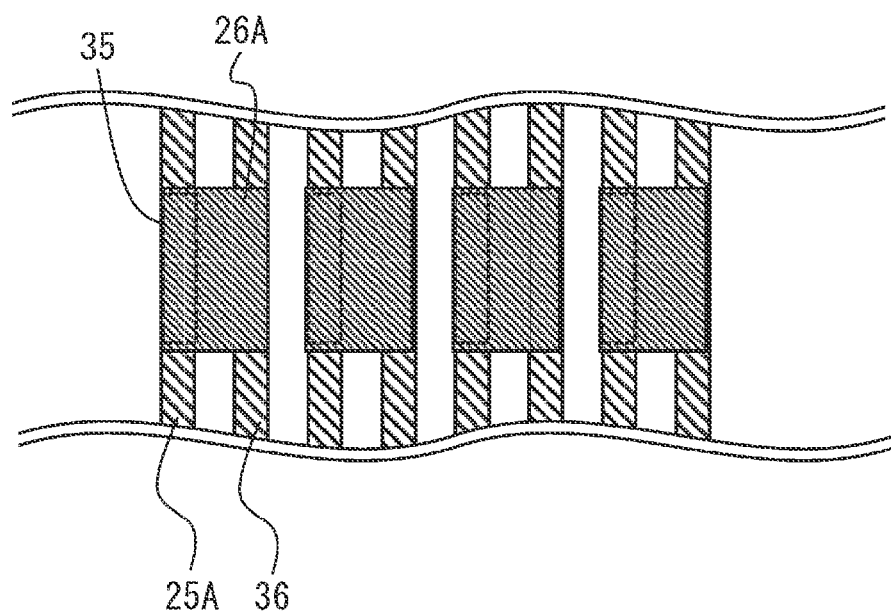
FIG. 4B is a schematic plan view of major constituent elements of a first in-panel testing terminal.

The first wire 25A, the second wire 25B, and the third wire 25C are disposed in the non-display region NR in such a way as to circumvent the demultiplexer circuit 24 and the mounting region MR, so these wires are small in width and narrow in spacing between them. For this reason, parts of the first in-panel testing terminal 26A and the second in-panel testing terminal 26B that are disposed in the non-display region NR are disposed on top of these wires too. FIG. 4A schematically shows a cross-sectional structure of a first in-panel testing terminal 26A, and FIG. 4B schematically shows a planar structure of major constituent elements of a first in-panel testing terminal 26A.

The first wire 25A and a wire 36 are disposed on top of the substrate 21. The wire 36 is either the second wire 25B or the third wire 25C. The first wire 25A and the wire 36 are simultaneously formed, for example, by the same metallic material as the gate electrodes that constitute the TFTs of the pixel PX.

A first insulating layer 33 is formed on top of the substrate 21 so as to cover the first wire 25A and the wire 36. The first insulating layer 33 is constituted by an inorganic insulating material such as silicon oxide or silicon nitride. It is preferable that the first insulating layer 33 be formed at the same time as one of the inorganic insulating layers included in the pixels PX. The first insulating layer 33 has formed therein a contact hole 33c through which part of the first wire 25A is exposed, with a first metallic layer 35 disposed in the contact hole 33c and on top of the first insulating layer 33. The first metallic layer 35 is simultaneously formed by the same metallic material as the source electrodes of the TFTs of the pixels PX.

A second insulating layer 34 is disposed on top of the first insulating layer 33 so as to cover the first metallic layer 35. The second insulating layer 34 is constituted by an inorganic insulating material such as silicon oxide or silicon nitride. It is preferable that the second insulating layer 34 be formed at the same time as one of the inorganic insulating layers included in the pixels PX. The second insulating layer 34 has formed therein a contact hole 34c through which part of the first metallic layer 35 is exposed, with the first in-panel testing terminal 26A disposed in the contact hole 34c and on top of the second insulating layer 34. Part of the first in-panel testing terminal 26A is located above the wire 36 too. In other words, part of the first in-panel testing terminal 26A is disposed above at least either of the second wire 25B and the third wire 25C.

The first in-panel testing terminal 26A is simultaneously formed by the same metallic material as the pixel electrodes PE of the pixels PX. That is, the first in-panel testing terminal 26A may be constituted by a translucent electrical conducting material.

The second in-panel testing terminal 26B has a similar structure. Part of the second in-panel testing terminal 26B is disposed above at least either of the first wire 25A and the third wire 25C.

Since the first in-panel testing terminal 26A and the second in-panel testing terminal 26B are thus configured, the first in-panel testing terminal 26A and the second in-panel testing terminal 26B can have areas large enough to allow secure connection of probe pins or other components of testing equipment. This makes it possible to dispose the first in-panel testing terminal 26A and the second in-panel testing terminal 26B, which can be used for testing, in the non-display region NR even when the first wire 25A, the second wire 25B, and the third wire 25C are densely arranged.

Figure 6A:
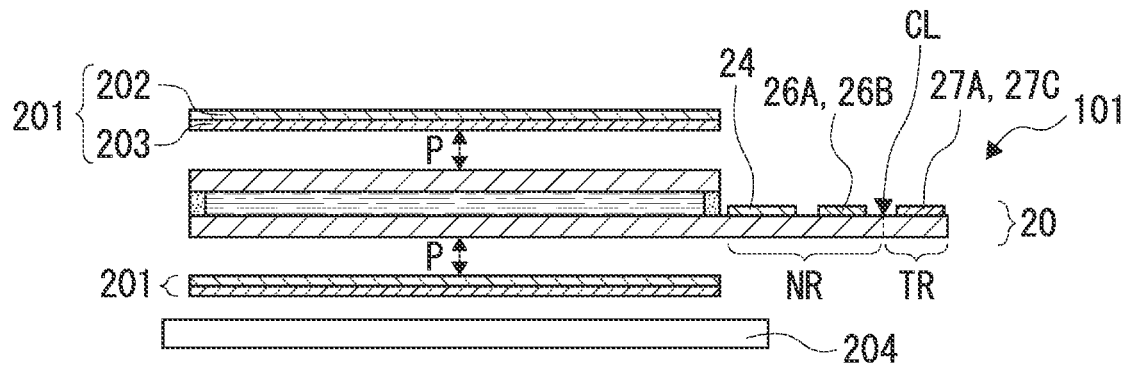
FIG. 6A is a cross-sectional view illustrating a step of the method for manufacturing a liquid crystal display device of the first embodiment.
Figure 6B:
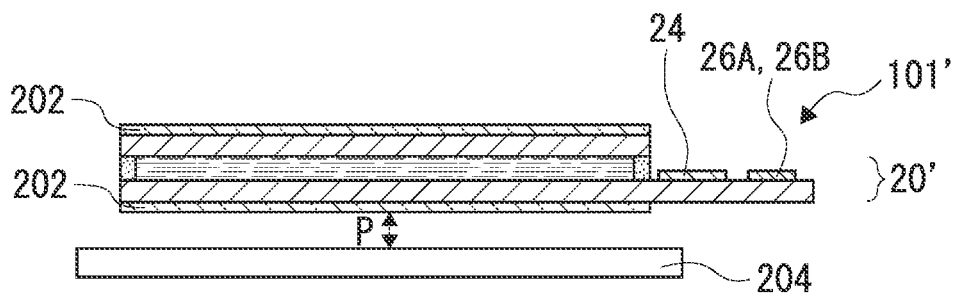
FIG. 6B is a cross-sectional view illustrating a step of the method for manufacturing a liquid crystal display device of the first embodiment.
Figure 6C:
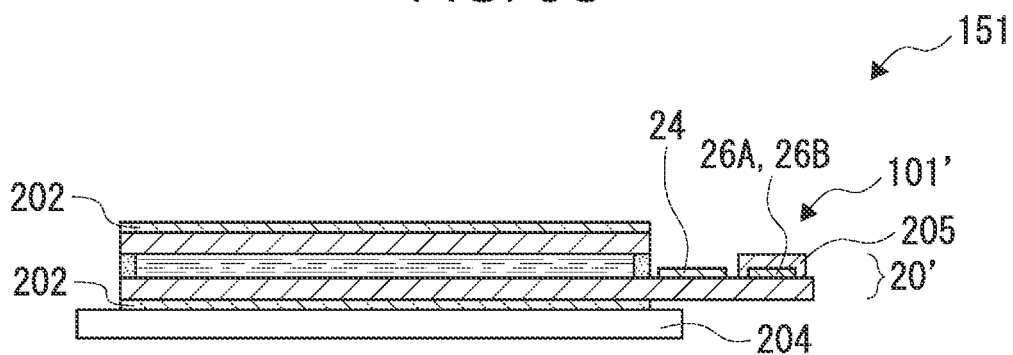
FIG. 6C is a cross-sectional view illustrating a step of the method for manufacturing a liquid crystal display device of the first embodiment.

Next, a method for manufacturing a liquid crystal display device of the present embodiment is described. FIG. 5 is a flow chart showing the method for manufacturing a liquid crystal display device of the present embodiment. FIGS. 6A to 6C are cross-sectional views illustrating steps of the method for manufacturing a liquid crystal display device of the present embodiment. The method for manufacturing a liquid crystal display device of the present embodiment includes a step of preparing a liquid crystal panel, a step of performing a performance test on the liquid crystal panel, a step of removing a testing terminal region, a step of pasting polarizing plates, a step of performing a lighting test, and a step of mounting a source driver IC. The following describes each of the steps in detail.

(1) Step of Preparing Liquid Crystal Panel (S-1)

First, the liquid crystal panel 101 shown in FIGS. 1 and 2 are fabricated. The liquid crystal panel 101 can be fabricated using a semiconductor manufacturing technique that is used in the manufacture of a common liquid crystal panel.

(2) Step of Performing Performance Test on Liquid Crystal Panel (S-2)

Next, a performance test is performed on the liquid crystal panel 101 using the first out-panel testing terminal 27A and the second out-panel testing terminal 27C. The performance test includes a performance test on the gate driver circuit 23, the demultiplexer circuit 24, and the plurality of pixels PX. First, as shown in FIG. 6A, a pair of polarizing plates 201 each including a polarizing film 202 and a transparent substrate 203 supporting the polarizing plate 202 are placed over and under the liquid crystal panel 101. A backlight 204 is placed behind the liquid crystal panel 101 and lit up.

This step can also be executed by performing the performance test with the polarizing films 202 pasted to the liquid crystal panel 101. However, in this case, unless the liquid crystal panel 101 passes the performance test, the polarizing films 202 thus pasted are discarded and wasted.

Further, it is preferable that the polarizing plates 201 be placed at spacings P from the liquid crystal panel 101. Bringing the polarizing plates 201 into contact with the liquid crystal panel 101 may cause dirt and dust to adhere to the liquid crystal panel 101 or causes surfaces of the liquid crystal panel 101 to be scratched.

Testing equipment including probe pins is prepared, and in this state, the first out-panel testing terminal 27A and the second out-panel testing terminal 27C of the liquid crystal panel 101 are brought into contact with the probe pins. The testing equipment generates at least a control signal for a performance test and applies the control signal to the first out-panel testing terminal 27A and the second out-panel testing terminal 27C. The testing equipment outputs the control signal to the gate driver circuit 23 via the second out-panel testing terminal 27C so as to generate a gate signal that scans the gate bus lines GL. Further, the testing equipment outputs, to the demultiplexer circuit 24 via the first out-panel testing terminal 27A, a display data signal serially containing RGB luminance information for each pixel. This makes the gate driver circuit 23 and the demultiplexer circuit 24 start to work, so that the pixels PX start to work.

The testing equipment may receive from the liquid crystal panel 101 via the first out-panel testing terminal 27A and/or the second out-panel testing terminal 27C, a signal(s) for determining whether the gate driver circuit 23 and the demultiplexer circuit 24 are working properly.

Figure 7:
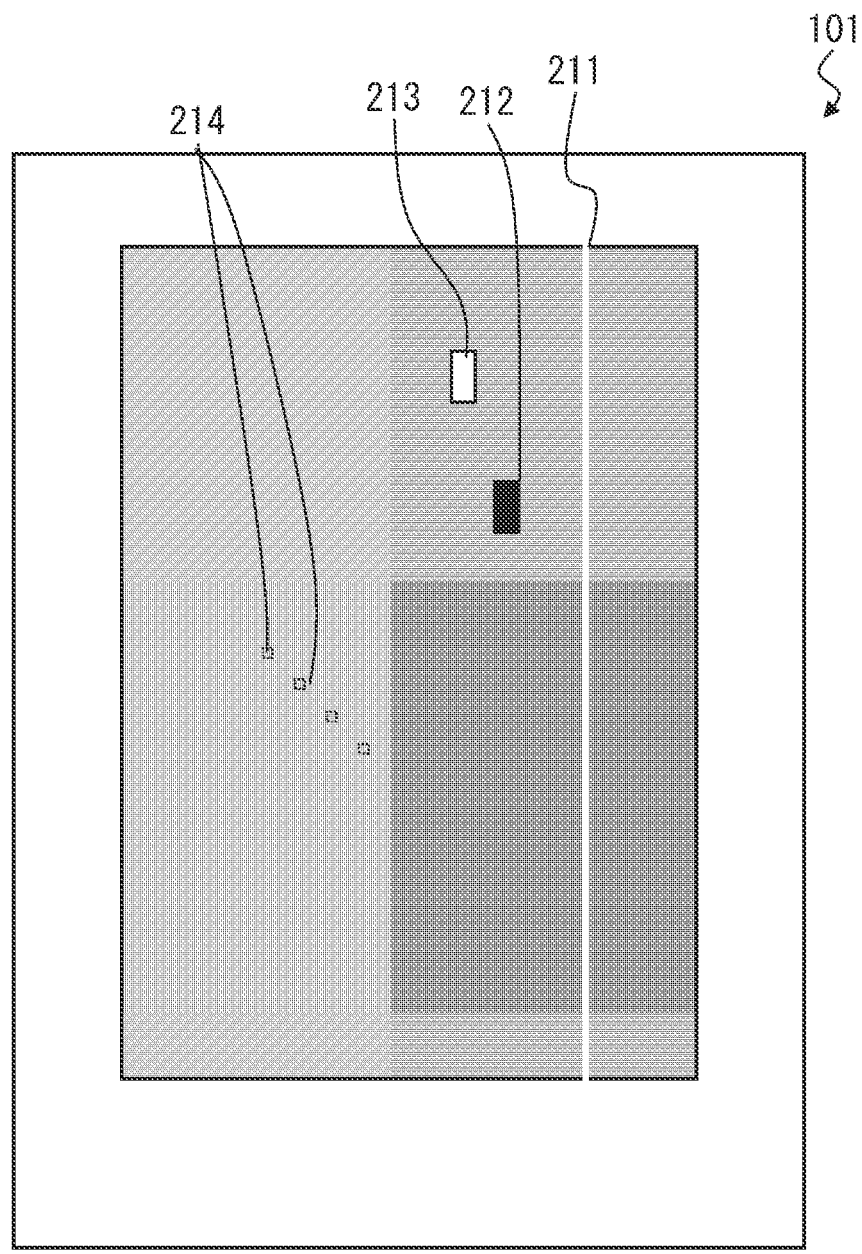
FIG. 7 schematically shows an example of a test image in a performance test step.

Then, an image formed by the pixels PX being driven by the testing equipment is tested. The liquid crystal panel 101 is made to perform a black display (light down) and a white display (light up), and black-spot defects and bright-spot defects are detected. The test may be performed by taking an image with an imaging device and subjecting the image to pattern recognition. FIG. 7 schematically shows an example of a test image. Although black-spot detects are detected by a white display and bright-spot defects are detected by a black display, FIG. 7 shows both black-spot defects and bright-spot defects together for descriptive purposes.

For example, as shown in FIG. 7, there may be a linear bright-spot defect 211, a point-like black-spot defect 212 across a plurality of pixels, and a point-like bright-spot defect 213 across a plurality of pixels. Meanwhile, one or several pixel bright-spot/black-spot defects 214 are minute, and the presence of the spacings P between the polarizing plates 201 and the liquid crystal panel 101 causes interdiffusion of light between a defect region and a boundary with a region surrounding the defect region. This makes the bright-spot/black-spot defects 214 less noticeable. For this reason, there is a case where the bright-spot/black-spot defects 214 are hardly found by tests.

The number and distribution of defects detected by the aforementioned test are compared with reference values, and when the number and the distribution exceed the reference values, the liquid crystal panel 101 is rejected.

(3) Step of Removing Testing Terminal Region (S-3)

Figure 8:
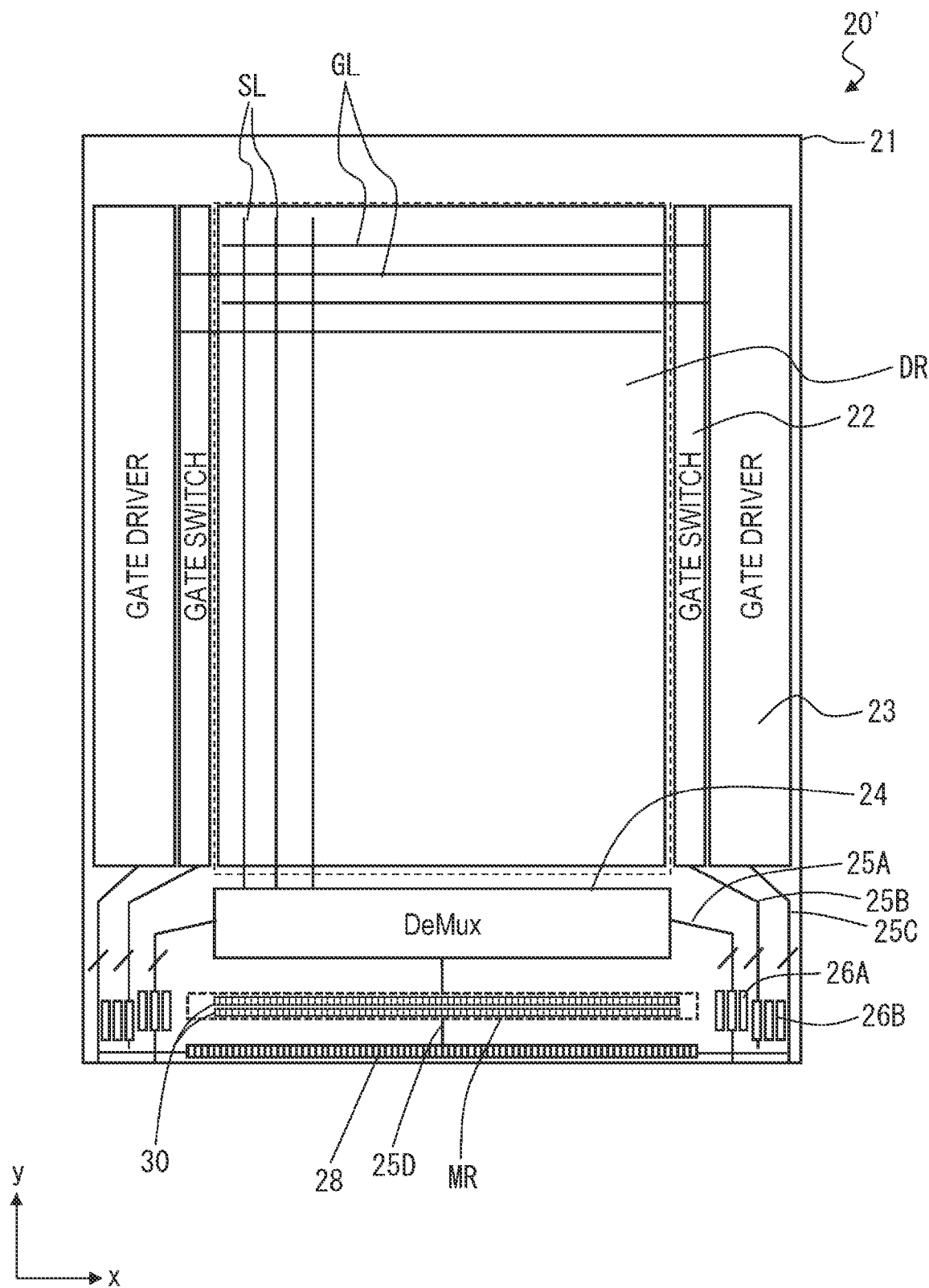
FIG. 8 is a schematic view showing the configuration of the active matrix substrate after removal of a testing terminal region.

The testing terminal region TR of a liquid crystal panel 101 that passed the performance test is removed. Since the first out-panel testing terminal 27A and the second out-panel testing terminal 27C, which are disposed in the testing terminal region TR, are used exclusively for the aforementioned performance test, a substrate cutting apparatus including a saw blade is used after the end of the performance test to cut the active matrix substrate 20 of the liquid crystal panel 101 at the position (FIG. 2) of a boundary CL between the testing terminal region TR and the non-display region NR. This gives a liquid crystal panel 101' including an active matrix substrate 20' shown in FIG. 8.

(4) Step of Pasting Polarizing Plates (S-4)

As shown in FIG. 6B, the pair of polarizing films 202 are pasted to the liquid crystal panel 101'. The polarizing films 202 can be pasted to the liquid crystal panel 101' using an adhesive or an adhesion layer.

(5) Step of Performing Lighting Test (S-5)

Next, the first in-panel testing terminal 26A and the second in-panel testing terminal 26B are used to perform a lighting test on the pixels of the liquid crystal panel 101' with the polarizing films 202 pasted thereto. Since the liquid crystal panel 101' already passed the performance test, minute bright-spot defects and black-spot defects that were not detected during the performance test are detected here by a white display and a black display.

The backlight 204 is placed behind the liquid crystal panel 101' at a spacing P and lit up. Next, testing equipment including probe pins is prepared, and in this state, the first in-panel testing terminal 26A and the second in-panel testing terminal 26B of the liquid crystal panel 101' are brought into contact with the probe pins. The testing equipment applies, to the gate switch circuit 22 and the demultiplexer circuit 24 via the first in-panel testing terminal 26A and the second in-panel testing terminal 26B, a control signal that causes all pixels PX of the liquid crystal panel 101' to simultaneously perform a white display (light up) and a black display (light down). A halftone display such as a gray display may be performed instead of a white display.

Figure 9:
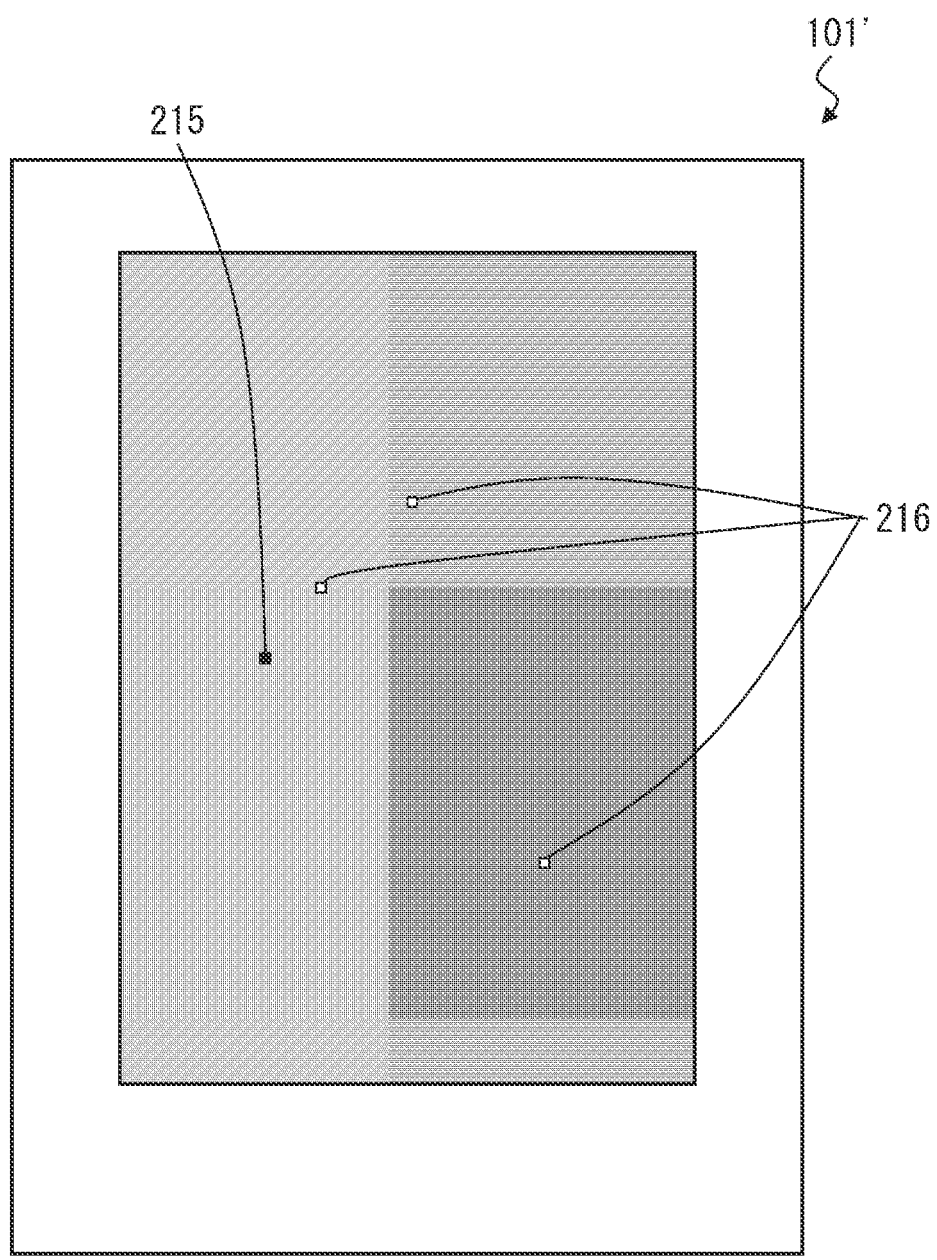
FIG. 9 schematically shows an example of a test image in a lighting test step.

FIG. 9 schematically shows an example of a test image based on a lighting test. As is the case with FIG. 7, FIG. 9 shows black-spot defects and bright-spot defects together for descriptive purposes. For example, as shown in FIG. 9, there exit one or several black-spot defects 215 and bright-spot defects 216 in the screen. As mentioned above, the pasting of the polarizing films 202 to the liquid crystal panel 101' inhibits light having passed through the liquid crystal panel 101' from diffusing in passing through the polarizing films 202, making it easier to detect the black-spot defects 215 and the bright-spot defects 216.

The number and distribution of defects detected by visual inspection or pattern recognition of an image taken are compared with reference values, and when the number and the distribution exceed the reference values, the liquid crystal panel 101' is rejected.

(6) Step of Mounting Source Driver IC (S-6)

Figure 10:
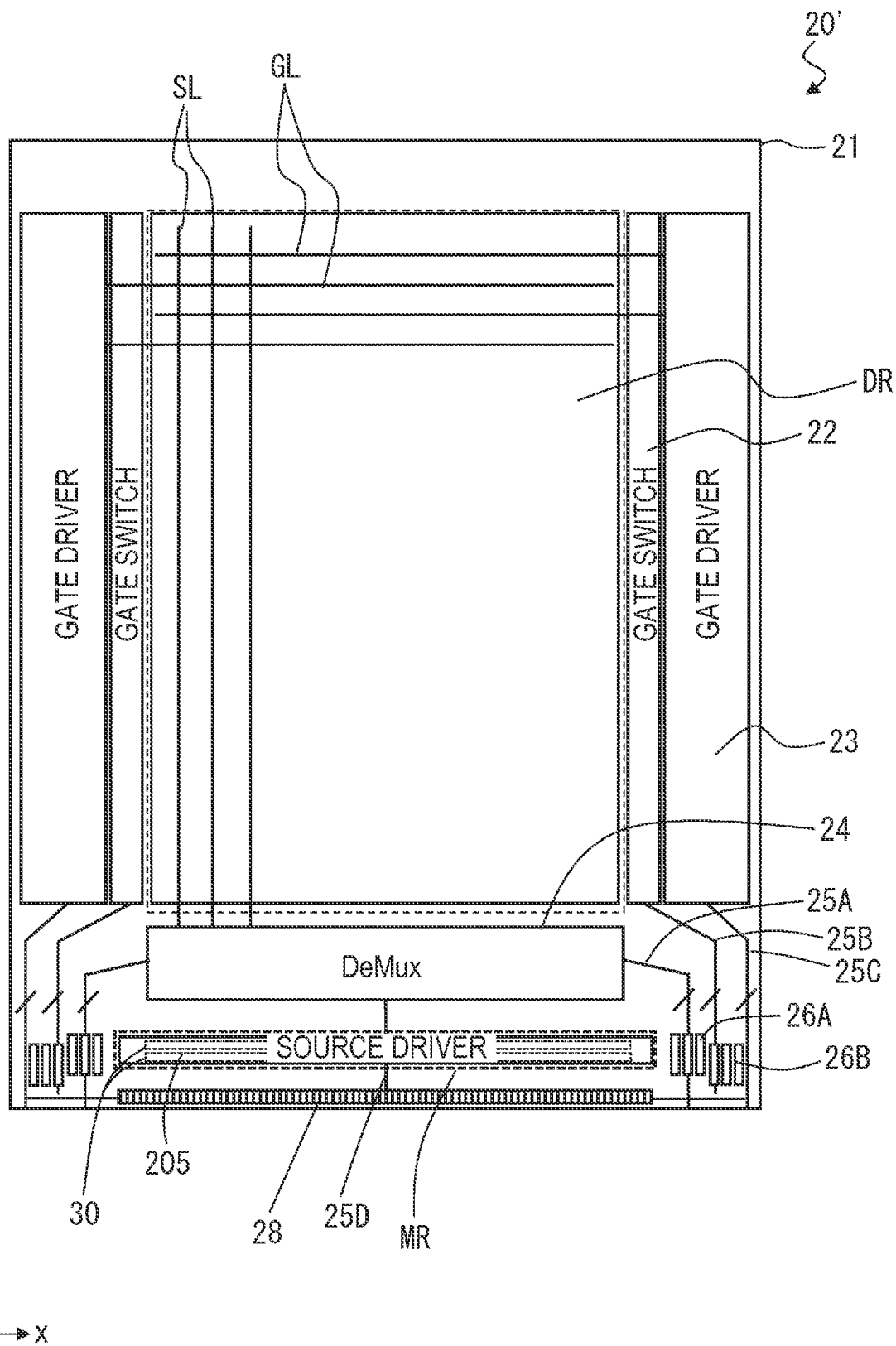
FIG. 10 is a schematic view showing the configuration of the active matrix substrate after mounting of a source driver IC.

The source driver IC is mounted on a liquid crystal panel 101' that passed the lighting test. As shown in FIGS. 6C and 10, a bare chip or a packaged source driver IC 205 sealed with resin is placed in the mounting region MR of the active matrix substrate 20', and terminals of the source driver IC 205 are connected to the pads 30 by soldering or other processes. This causes the source driver IC 205 to be connected to the demultiplexer circuit 24 and the external terminal 28 by the fourth wire 25D. After that, the backlight 204 is attached to the liquid crystal panel 101'. Thus, a liquid crystal display device 151 of the present embodiment is completed.

With the second out-panel testing terminal 27C connected to the gate driver circuit 23, the first out-panel testing terminal 27A connected to the demultiplexer circuit 24, the second in-panel testing terminal 26B connected to the gate switch circuit 22, and the first in-panel testing terminal 26A connected to the demultiplexer circuit 24, the liquid crystal panel and the method for manufacturing a liquid crystal display device according to the present embodiment makes it possible to test the liquid crystal panel at different stages during a manufacturing process. Specifically, the performance of the gate driver circuit 23, the demultiplexer circuit 24, and the pixels PX can be tested using the first out-panel testing terminal 27A and the second out-panel testing terminal 27C. Subsequent removal of the testing terminal region TR makes it possible to make the testing terminal region TR wide and dispose the first out-panel testing terminal 27A and the second out-panel testing terminal 27C of sufficient size. Further, removing the testing terminal region TR after the performance test inhibits the liquid crystal display device 151 from having a large frame.

Further, even after removal of the testing terminal region TR, the first in-panel testing terminal 26A and the second in-panel testing terminal 26B can be used to control the gate switch circuit 22 and the demultiplexer circuit 24 to light up the pixels to perform a test. This makes it possible to find minute bright-spot/black-spot defects with polarizing films pasted to a liquid crystal panel that passed the performance test. Further, this test may be a simple test, as this test is performed on a liquid crystal panel that passed the performance test. This makes it possible to limit the number of first in-panel testing terminals 26A and second in-panel testing terminals 26B to inhibit the liquid crystal display device 151 from having a large frame.

Furthermore, performing multiple separate tests makes it possible to test the liquid crystal panel before each step such as after the fabrication of the liquid crystal panel, the pasting of the polarizing films, and the mounting of the source driver IC. This makes it possible to reduce components or members that are wasted together by the liquid crystal panel being rejected.

Second Embodiment

Figure 11:
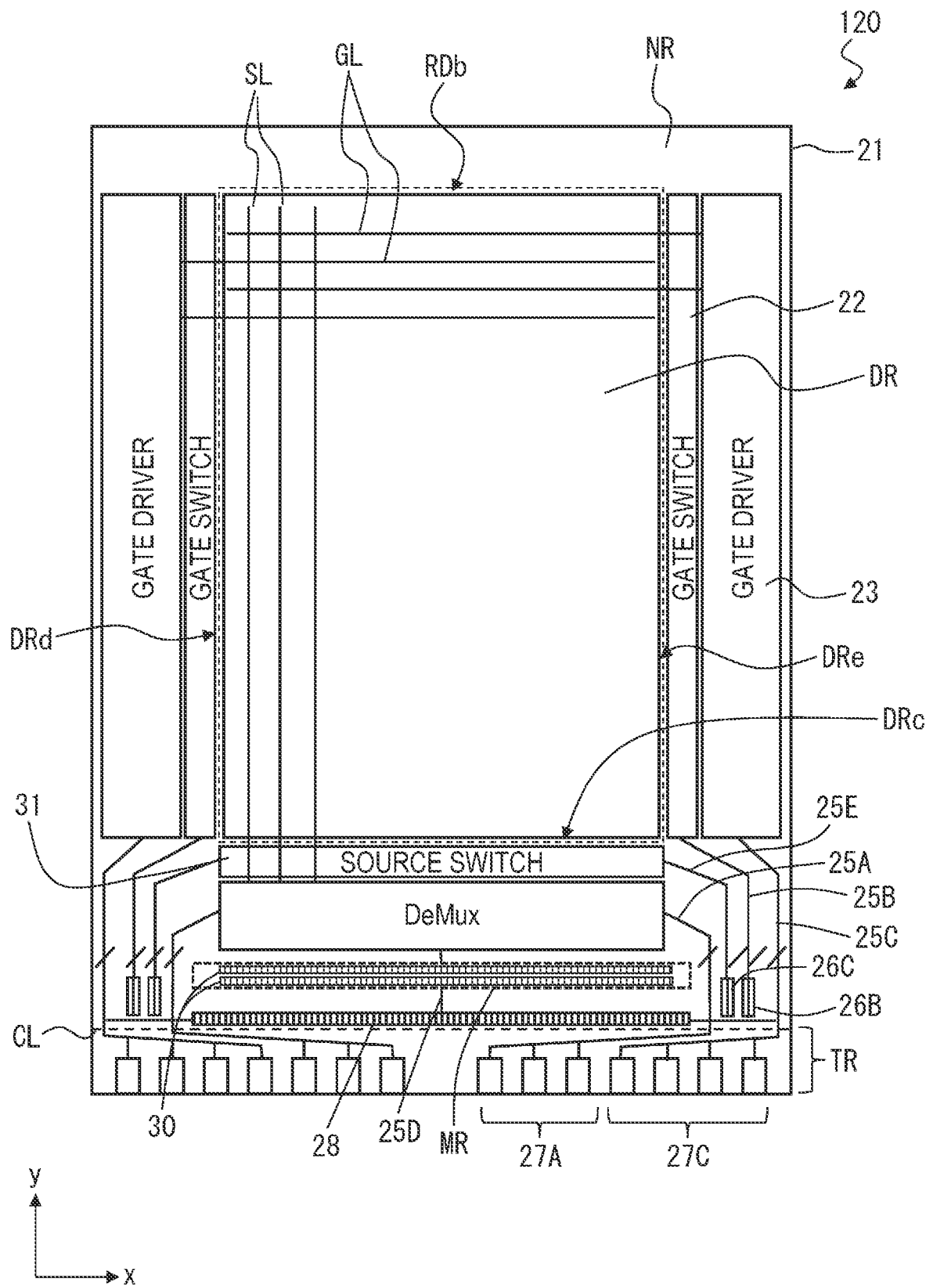
FIG. 11 is a schematic view showing a configuration of an active matrix substrate of a liquid crystal panel of a second embodiment.

FIG. 11 is a schematic view showing a configuration of an active matrix substrate 120 of a liquid crystal panel of the present embodiment. The liquid crystal panel of the present embodiment differs from the liquid crystal panel of the first embodiment in that the active matrix substrate 120 does not include the first in-panel testing terminal 26A and further includes a source switch circuit 31 and a third in-panel testing terminal 26C.

Specifically, the active matrix substrate 120 does not include the first in-panel testing terminal 26A, and the first wire 25A connects the demultiplexer circuit 24 to the first out-panel testing terminal 27A.

Meanwhile, the active matrix substrate 120 further includes the source switch circuit 31, which is disposed in the non-display region NR on top of the substrate 21, the third in-panel testing terminal 26C, and a fifth wire 25E.

The source switch circuit 31, the third in-panel testing terminal 26C, and the fifth wire 25E are each disposed in the non-display region NR of the active matrix substrate 120.

The source switch circuit 31 is disposed adjacent to the side DRd of the display region DR and connected to one end of each of the source bus lines SL.

The fifth wire 25E connects the source switch circuit 31 to the third in-panel testing terminal 26C.

The source switch circuit 31 is a circuit provided for testing the liquid crystal panel of the present embodiment and simultaneously lights up/down the pixels PX of the liquid crystal panel of the present embodiment in order to find bright-spot defects and black-spot defects in the liquid crystal panel of the present embodiment. Specifically, the gate switch circuit 22 simultaneously outputs, to the plurality of source bus lines SL, display data signals for applying voltages to the pixel electrodes PE of each separate pixel PX.

Since the source switch circuit 31 does not individually control the pixels PX, the number of terminals that need to be driven may be smaller than in a case where the pixels PX of the liquid crystal panel of the present embodiment are simultaneously lit up/down using the demultiplexer circuit 24. That is, the number of third in-panel testing terminals 26C may be smaller than the number of first in-panel testing terminals 26A. This makes it possible to make the third in-panel testing terminal 26C large in area.

Figure 12:
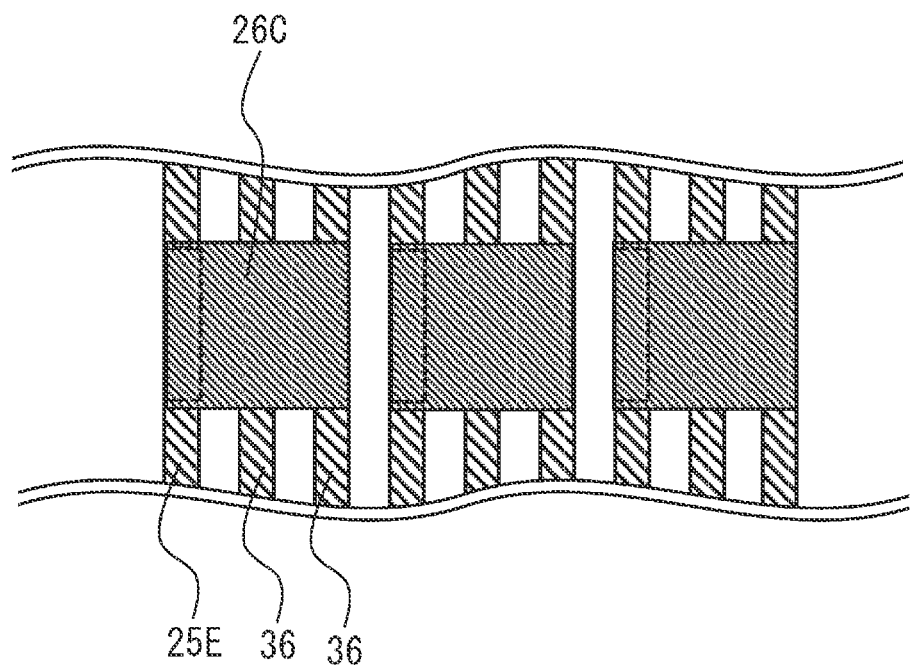
FIG. 12 is a schematic plan view of major constituent elements of a third in-panel testing terminal.

For example, as shown in FIG. 12, part of the third in-panel testing terminal 26C can be disposed above a plurality of the wires 36. The plurality of wires 36 here are each the first wire 25A, the second wire 25B, or the third wire 25C. That is, part of the third in-panel testing terminal 26C may be disposed above at least one of the first wire 25A, the second wire 25B, and the third wire 25C. A similar structure can be adopted for the second in-panel testing terminal 26B too. Specifically, part of the second in-panel testing terminal 26B may be disposed above at least one of the first wire 25A, the third wire 25C, and the fifth wire 25E.

The present embodiment makes it possible to make the third in-panel testing terminal 26C larger in area, for example, by forming the third in-panel testing terminal 26C into such a shape as to cover a larger number of wires 36 than the first in-panel testing terminal 26A of the first embodiment. This makes it possible to more surely connect probe pins or other components of testing equipment to the third in-panel testing terminal 26C in a pixel lighting test after removal of the testing terminal region TR.

A liquid crystal display device of the present embodiment can be fabricated in a manner that is similar to that in which the liquid crystal display device of the first embodiment is fabricated.

With the second out-panel testing terminal 27C connected to the gate driver circuit 23, the first out-panel testing terminal 27A connected to the demultiplexer circuit 24, the second in-panel testing terminal 26B connected to the gate switch circuit 22, and the third in-panel testing terminal 26C connected to the source switch circuit 31, the liquid crystal panel and the method for manufacturing a liquid crystal display device according to the present embodiment makes it possible to test the liquid crystal panel at different stages during a manufacturing process. Further, the liquid crystal panel of the present embodiment can bring about effects that are similar to those of the liquid crystal panel of the first embodiment.

Other Embodiments

A liquid crystal panel and a method for manufacturing a liquid crystal display device according to the present disclosure can be variously altered. For example, as mentioned above, the numbers, locations, or other attributes of gate driver circuits, gate switch circuits, and demultiplexer circuits are not limited to the foregoing embodiments. Further, the numbers, shapes, locations, or other attributes of out-panel testing terminals and in-panel testing terminals too are not limited to the foregoing embodiments.

A liquid crystal panel and a method for manufacturing a liquid crystal display device according to the present disclosure can also be described as follows.

A liquid crystal panel according to a first configuration includes an active matrix substrate, a counter substrate, and a liquid crystal layer sandwiched between the active matrix substrate and the counter substrate. The active matrix substrate includes a substrate having a principal surface including a display region, a non-display region located around the display region, and a testing terminal region located outside and adjacent to the non-display region, a plurality of source bus lines each disposed in the display region of the substrate, the plurality of source bus lines extending in a first direction, a plurality of gate bus lines each disposed in the display region of the substrate, the plurality of gate bus extending in a second direction intersecting the first direction, a plurality of pixels disposed in the display region of the substrate, the pixels including TFTs each connected to one of the plurality of source bus lines and one of the plurality of gate bus lines, a first out-panel testing terminal disposed in the testing terminal region of the substrate, a second out-panel testing terminal disposed in the testing terminal region of the substrate, a first in-panel testing terminal disposed in the non-display region of the substrate, a second in-panel testing terminal disposed in the non-display region of the substrate, a gate driver circuit disposed in the non-display region of the substrate and connected to the plurality of gate bus lines and the second out-panel testing terminal, a gate switch circuit disposed in the non-display region of the substrate and connected to the plurality of gate bus lines and the second in-panel testing terminal, the gate switch circuit outputting a control signal to the plurality of gate bus lines in accordance with a signal that is inputted from the second in-panel testing terminal, and a demultiplexer circuit disposed in the non-display region of the substrate and connected to the plurality of source bus lines, the first out-panel testing terminal, and the first in-panel testing terminal.

With the second out-panel testing terminal connected to the gate driver circuit, the first out-panel testing terminal connected to the demultiplexer circuit, the second in-panel testing terminal connected to the gate switch circuit, and the first in-panel testing terminal connected to the demultiplexer circuit, the first configuration makes it possible to test the liquid crystal panel at different stages during a manufacturing process.

A liquid crystal panel according to a second configuration includes an active matrix substrate, a counter substrate, and a liquid crystal layer sandwiched between the active matrix substrate and the counter substrate. The active matrix substrate includes a substrate having a principal surface including a display region, a non-display region located around the display region, and a testing terminal region located outside and adjacent to the non-display region, a plurality of source bus lines each disposed in the display region of the substrate, the plurality of source bus lines extending in a first direction, a plurality of gate bus lines each disposed in the display region of the substrate, the plurality of gate bus extending in a second direction intersecting the first direction, a plurality of pixels disposed in the display region of the substrate, the pixels including TFTs each connected to one of the plurality of source bus lines and one of the plurality of gate bus lines, a first out-panel testing terminal disposed in the testing terminal region of the substrate, a second out-panel testing terminal disposed in the testing terminal region of the substrate, a second in-panel testing terminal disposed in the non-display region of the substrate, a third in-panel testing terminal disposed in the non-display region of the substrate, a gate driver circuit disposed in the non-display region of the substrate and connected to the plurality of gate bus lines and the second out-panel testing terminal, a gate switch circuit disposed in the non-display region of the substrate and connected to the plurality of gate bus lines and the second in-panel testing terminal, the gate switch circuit outputting a control signal to the plurality of gate bus lines in accordance with a signal that is inputted from the second in-panel testing terminal, a demultiplexer circuit disposed in the non-display region of the substrate and connected to the plurality of source bus lines and the first out-panel testing terminal, and a source switch circuit disposed in the non-display region of the substrate and connected to the plurality of source bus lines and the third in-panel testing terminal, the source switch circuit applying a predetermined voltage to the plurality of source bus lines in accordance with a signal that is inputted from the third in-panel testing terminal.

With the second out-panel testing terminal connected to the gate driver circuit, the first out-panel testing terminal connected to the demultiplexer circuit, the second in-panel testing terminal connected to the gate switch circuit, and the third in-panel testing terminal connected to the source switch circuit, the second configuration makes it possible to test the liquid crystal panel at different stages during a manufacturing process.

A liquid crystal panel according to a third configuration may be directed to the first configuration, further including a first wire connecting the demultiplexer circuit to the first out-panel testing terminal and the first in-panel testing terminal, a second wire connecting the gate switch circuit to the second in-panel testing terminal, and a third wire connecting the gate driver circuit to the second out-panel testing terminal. Part of the first in-panel testing terminal may be disposed above at least either of the second wire and the third wire. Part of the second in-panel testing terminal may be disposed above at least either of the first wire and the third wire.

A liquid crystal panel according to a fourth configuration may be directed to the second configuration, further including a first wire connecting the demultiplexer circuit to the first out-panel testing terminal, a fifth wire connecting the source switch circuit to the third in-panel testing terminal, a second wire connecting the gate switch circuit to the second in-panel testing terminal, and a third wire connecting the gate driver circuit to the second out-panel testing terminal Part of the second in-panel testing terminal may be disposed above at least one of the first wire, the third wire, and the fifth wire. Part of the third in-panel testing terminal may be disposed above at least one of the first wire, the second wire, and the third wire.

A liquid crystal panel according to a fifth configuration may be directed to any one of the first to fourth configurations, wherein the non-display region of the substrate includes a mounting region in which to mount a source driver IC.

A method for manufacturing a liquid crystal display device according to a sixth configuration includes preparing the liquid crystal panel according to any one of the first to fourth configurations, performing a performance test on the gate driver circuit, the demultiplexer circuit, and the plurality of pixels using the first out-panel testing terminal and the second out-panel testing terminal, removing the testing terminal region of the substrate from a liquid crystal panel that passed the performance test, pasting a pair of polarizing films to the liquid crystal panel, and performing a lighting test on the pixels using the first in-panel testing terminal or the third in-panel testing terminal and the second in-panel testing terminal.

The sixth configuration makes it possible to test the liquid crystal panel at different stages during a manufacturing process.

A method for manufacturing a liquid crystal display device according to a seventh configuration may be directed to the sixth configuration, wherein the non-display region of the substrate includes a mounting region in which to mount a source driver IC. The method may further include mounting the source driver IC on the mounting region in a liquid crystal panel that passed the lighting test.

A method for manufacturing a liquid crystal display device according to an eighth configuration may be directed to the sixth or seventh configuration, wherein the gate driver circuit and the demultiplexer circuit are monolithically formed on the substrate.

The present disclosure contains subject matter related to that disclosed in Japanese Priority Patent Application JP 2022-201651 filed in the Japan Patent Office on Dec. 16, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A liquid crystal panel comprising:
an active matrix substrate;
a counter substrate; and
a liquid crystal layer sandwiched between the active matrix substrate and the counter substrate,
wherein the active matrix substrate includes
a substrate having a principal surface including a display region, a non-display region located around the display region, and a testing terminal region located outside and adjacent to the non-display region,
a plurality of source bus lines each disposed in the display region of the substrate, the plurality of source bus lines extending in a first direction,
a plurality of gate bus lines each disposed in the display region of the substrate, the plurality of gate bus lines extending in a second direction intersecting the first direction,
a plurality of pixels disposed in the display region of the substrate, the pixels including TFTs each connected to one of the plurality of source bus lines and one of the plurality of gate bus lines,
a first out-panel testing terminal disposed in the testing terminal region of the substrate,
a second out-panel testing terminal disposed in the testing terminal region of the substrate,
a first in-panel testing terminal disposed in the non-display region of the substrate,
a second in-panel testing terminal disposed in the non-display region of the substrate,
a gate driver circuit disposed in the non-display region of the substrate and connected to the plurality of gate bus lines and the second out-panel testing terminal,
a gate switch circuit disposed in the non-display region of the substrate and connected to the plurality of gate bus lines and the second in-panel testing terminal, the gate switch circuit outputting a control signal to the plurality of gate bus lines in accordance with a signal that is inputted from the second in-panel testing terminal, and a demultiplexer circuit disposed in the non-display region of the substrate and connected to the plurality of source bus lines, the first out-panel testing terminal, and the first in-panel testing terminal.

2. A liquid crystal panel comprising:
an active matrix substrate;
a counter substrate; and
a liquid crystal layer sandwiched between the active matrix substrate and the counter substrate,
wherein the active matrix substrate includes
a substrate having a principal surface including a display region, a non-display region located around the display region, and a testing terminal region located outside and adjacent to the non-display region,
a plurality of source bus lines each disposed in the display region of the substrate, the plurality of source bus lines extending in a first direction,
a plurality of gate bus lines each disposed in the display region of the substrate, the plurality of gate bus extending in a second direction intersecting the first direction,
a plurality of pixels disposed in the display region of the substrate, the pixels including TFTs each connected to one of the plurality of source bus lines and one of the plurality of gate bus lines,
a first out-panel testing terminal disposed in the testing terminal region of the substrate,
a second out-panel testing terminal disposed in the testing terminal region of the substrate,
a second in-panel testing terminal disposed in the non-display region of the substrate,
a third in-panel testing terminal disposed in the non-display region of the substrate,
a gate driver circuit disposed in the non-display region of the substrate and connected to the plurality of gate bus lines and the second out-panel testing terminal,
a gate switch circuit disposed in the non-display region of the substrate and connected to the plurality of gate bus lines and the second in-panel testing terminal, the gate switch circuit outputting a control signal to the plurality of gate bus lines in accordance with a signal that is inputted from the second in-panel testing terminal,
a demultiplexer circuit disposed in the non-display region of the substrate and connected to the plurality of source bus lines and the first out-panel testing terminal, and
a source switch circuit disposed in the non-display region of the substrate and connected to the plurality of source bus lines and the third in-panel testing terminal, the source switch circuit applying a predetermined voltage to the plurality of source bus lines in accordance with a signal that is inputted from the third in-panel testing terminal.

3. The liquid crystal panel according to claim 1, further comprising:
a first wire connecting the demultiplexer circuit to the first out-panel testing terminal and the first in-panel testing terminal;
a second wire connecting the gate switch circuit to the second in-panel testing terminal; and
a third wire connecting the gate driver circuit to the second out-panel testing terminal,
wherein
part of the first in-panel testing terminal is disposed above at least either of the second wire and the third wire, and
part of the second in-panel testing terminal is disposed above at least either of the first wire and the third wire.

4. The liquid crystal panel according to claim 2, further comprising:
a first wire connecting the demultiplexer circuit to the first out-panel testing terminal;
a fifth wire connecting the source switch circuit to the third in-panel testing terminal;
a second wire connecting the gate switch circuit to the second in-panel testing terminal; and
a third wire connecting the gate driver circuit to the second out-panel testing terminal,
wherein
part of the second in-panel testing terminal is disposed above at least one of the first wire, the third wire, and the fifth wire, and
part of the third in-panel testing terminal is disposed above at least one of the first wire, the second wire, and the third wire.

5. The liquid crystal panel according to claim 1, wherein the non-display region of the substrate includes a mounting region in which to mount a source driver IC.

6. The liquid crystal panel according to claim 2, wherein the non-display region of the substrate includes a mounting region in which to mount a source driver IC.

7. A method for manufacturing a liquid crystal display device, the method comprising:
preparing the liquid crystal panel according to claim 1;
performing a performance test on the gate driver circuit, the demultiplexer circuit, and the plurality of pixels using the first out-panel testing terminal and the second out-panel testing terminal;
removing the testing terminal region of the substrate from a liquid crystal panel that passed the performance test;
pasting a pair of polarizing films to the liquid crystal panel; and
performing a lighting test on the pixels using the first in-panel testing terminal and the second in-panel testing terminal.

8. The method according to claim 7, wherein
the non-display region of the substrate includes a mounting region in which to mount a source driver IC, and
the method further comprising mounting the source driver IC on the mounting region in a liquid crystal panel that passed the lighting test.

9. The method according to claim 7, wherein in the liquid crystal panel, the gate driver circuit and the demultiplexer circuit are monolithically formed on the substrate.

* * * * *